US012469032B1

(12) United States Patent
Davey et al.

(10) Patent No.: US 12,469,032 B1
(45) Date of Patent: Nov. 11, 2025

(54) MULTI-FACTOR AUTHENTICATION BASED ON AUDIO MESSAGE

(71) Applicant: United Services Automobile Association (USAA), San Antonio, TX (US)

(72) Inventors: Richard Davey, San Antonio, TX (US); Patrick Sturdivant, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 393 days.

(21) Appl. No.: 16/405,684

(22) Filed: May 7, 2019

Related U.S. Application Data

(60) Provisional application No. 62/669,789, filed on May 10, 2018.

(51) Int. Cl.
| | |
|---|---|
| *G06Q 20/40* | (2012.01) |
| *G06F 21/35* | (2013.01) |
| *G06F 21/40* | (2013.01) |
| *G06Q 20/10* | (2012.01) |
| *G06Q 20/32* | (2012.01) |
| *G06Q 20/38* | (2012.01) |
| *H04B 11/00* | (2006.01) |

(52) U.S. Cl.
CPC ......... *G06Q 20/4012* (2013.01); *G06F 21/35* (2013.01); *G06F 21/40* (2013.01); *G06Q 20/1085* (2013.01); *G06Q 20/3272* (2013.01); *G06Q 20/3821* (2013.01); *H04B 11/00* (2013.01)

(58) Field of Classification Search
CPC ................. G06Q 20/1085; G06Q 20/3272
See application file for complete search history.

(56) References Cited

U.S. PATENT DOCUMENTS

| | | | |
|---|---|---|---|
| 7,533,735 B2 | 5/2009 | Gantman et al. | |
| 9,183,554 B1 * | 11/2015 | Courtright | ........... G06Q 20/202 |
| 9,558,636 B1 * | 1/2017 | Burdick | ................ G07F 19/209 |
| 9,843,583 B2 | 12/2017 | Holz | |

(Continued)

FOREIGN PATENT DOCUMENTS

| | | | | |
|---|---|---|---|---|
| EP | 1071076 A1 * | 1/2001 | ......... | G10L 19/0018 |
| WO | WO-2016153398 A1 * | 9/2016 | ............. | G06F 21/35 |

*Primary Examiner* — Jay Huang
(74) *Attorney, Agent, or Firm* — Fish & Richardson P.C.

(57) ABSTRACT

Techniques are described for accessing an account on a public device. In some implementations, an audio message is received from a portable computing device, requesting to establish an account access session between the portable computing device and the public device. A first communication based on the audio message is sent from the public device to a backend server. The backend server analyzes the first communication to determine whether the portable computing device is authorized to establish the account access session. A second communication is received from the backend server, indicating that the portable computing device is authorized. In response, the account access session is established between the portable computing device and the public device, wherein the account access session is employed by an application executing on the portable computing device to access account information associated with an account of a user of the portable computing device.

18 Claims, 9 Drawing Sheets

(56) References Cited

U.S. PATENT DOCUMENTS

| | | | | |
|---|---|---|---|---|
| 10,445,711 B1* | 10/2019 | Arumugam | | G06Q 20/3274 |
| 2006/0206709 A1* | 9/2006 | Labrou | | G06Q 20/4014 |
| | | | | 713/167 |
| 2012/0160912 A1* | 6/2012 | Laracey | | G06F 21/43 |
| | | | | 235/379 |
| 2012/0196586 A1* | 8/2012 | Grigg | | H04B 5/0031 |
| | | | | 455/418 |
| 2012/0197797 A1* | 8/2012 | Grigg | | G07F 19/20 |
| | | | | 705/43 |
| 2013/0226799 A1* | 8/2013 | Raj | | G07C 9/00 |
| | | | | 705/44 |
| 2014/0214415 A1* | 7/2014 | Klein | | G06F 3/167 |
| | | | | 704/231 |
| 2016/0078416 A1* | 3/2016 | DeLuca | | G07F 19/205 |
| | | | | 705/43 |
| 2016/0098904 A1* | 4/2016 | Choudhury | | G07F 19/203 |
| | | | | 705/43 |
| 2016/0275760 A1* | 9/2016 | Block | | G07F 19/203 |
| 2017/0185996 A1* | 6/2017 | Parekh | | G06Q 20/3672 |
| 2017/0331807 A1* | 11/2017 | Mont-Reynaud | | H04W 12/082 |
| 2018/0114222 A1* | 4/2018 | Furey | | G07F 19/20 |
| 2020/0279243 A1* | 9/2020 | Kohli | | G06Q 20/1085 |

\* cited by examiner

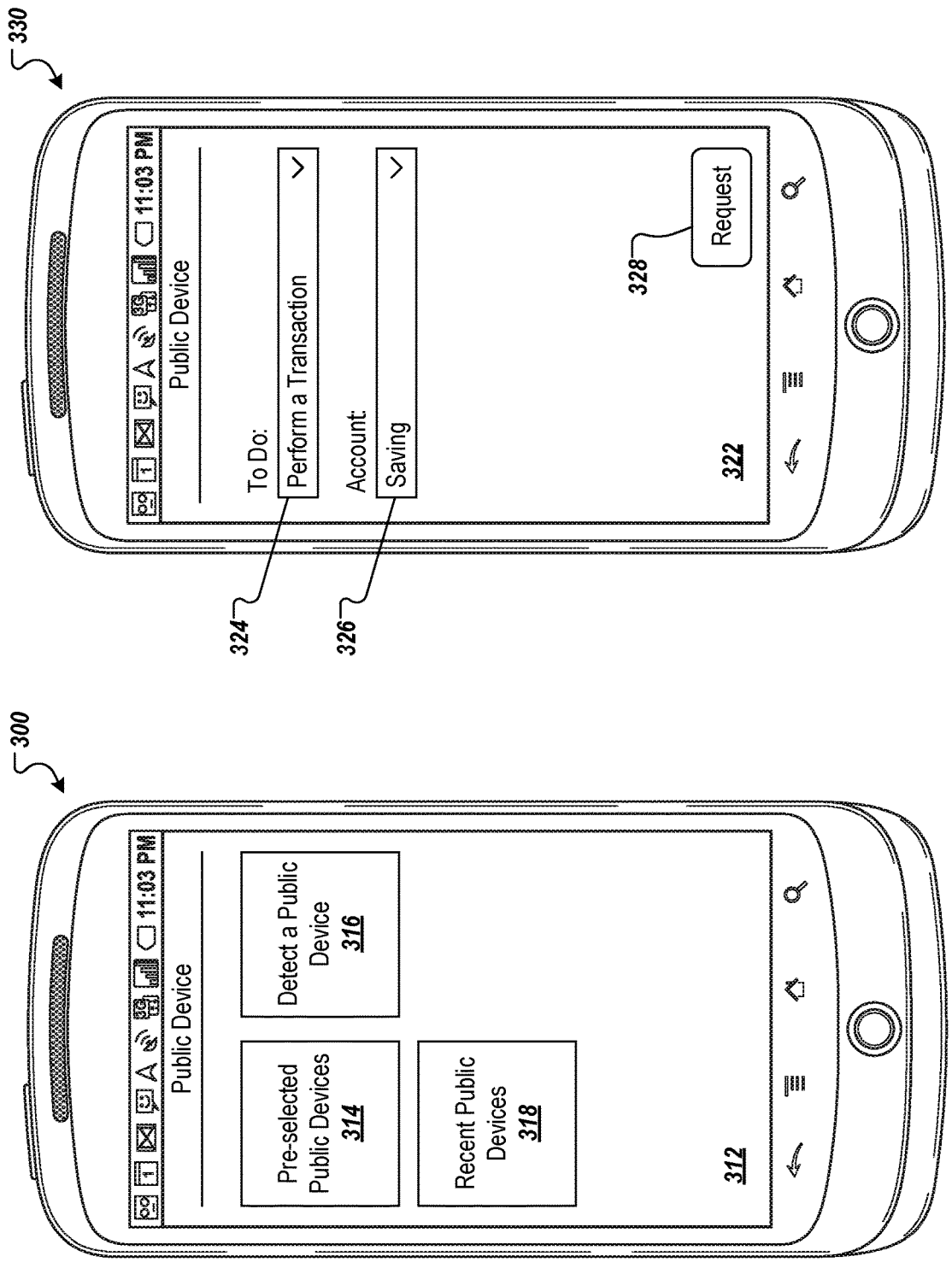

US 12,469,032 B1

MULTI-FACTOR AUTHENTICATION BASED ON AUDIO MESSAGE

CROSS-REFERENCE TO RELATED APPLICATION

This application claims priority under 35 U.S.C. § 119 to U.S. Application Ser. No. 62/669,789, filed on May 10, 2018, and entitled "Multi-Factor Authentication Based on Audio Message," the entire contents of which is incorporated by reference herein.

BACKGROUND

User authentication is to verify the identity and/or authorization of a user who requests access to services, data, and resources from networked or Internet connected devices and resources. User authentication is to improve the security of a service that is accessed locally or over a network. By confirming identity of the requesting user, an unauthorized or falsely claimed user may be prevented from accessing, using, and/or manipulating data and/or features provided by the service.

SUMMARY

Implementations of the present disclosure are generally directed to user authentication. More specifically, implementations are directed to audio-based multi-factor authentication of a first device to access one or more user accounts on a second device through a communication session with the first device.

In general, innovative aspects of the subject matter described in this specification can be embodied in methods that include operations of: receiving an audio message that is sent from a portable computing device to request establishing an account access session between the portable computing device and the public device; sending a first communication from the public device to at least one backend server, the first communication being generated based on the audio message, wherein the at least one backend server is configured to analyze the first communication to determine whether the portable computing device is authorized to establish the account access session with the public device; and receiving, from the at least one backend server, a second communication indicating that the portable computing device is authorized to establish the account access session and, in response, establishing the account access session between the portable computing device and the public device, wherein the account access session is employed by an application executing on the portable computing device to access account information associated with at least one account of a user of the portable computing device.

Implementations can optionally include one or more of the following features: in response to establishing the account access session, receiving a request from the portable computing device to perform a change on the at least one account, and updating the account information based on the requested change; the change includes one or more of transferring funds to the at least one account and withdrawing funds from the at least one account; the public device is an automated teller machine; the operations further including decoding the audio message to obtain a numeric code encoded in the audio message, and wherein the first communication is at least partly based on the numeric code; the numeric code is provided for one-time use in determining whether the portable computing device is authorized; the second communication indicates that the portable computing device is authorized to access the at least one account; a numeric code is encoded in the audio message, the numeric code being associated with the portable computing device and being used by the backend server to determine whether the portable computing device is authorized to establish the account access session with the public device; the operations further including transmitting a confirmation message to the portable computing device, the confirmation message indicating that the portable computing device is authorized to access the public device.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

For example, a system is disclosed that includes: one or more public devices configured to receive an audio message from a portable computing device, the audio message including a request to access an account on one of the one or more public devices; and a backend server configured to determine whether the portable computing device is authorized to access the account. The backend server includes at least one processor and a memory communicatively coupled to the at least one processor, the memory storing instructions which, when executed, cause the at least one processor to perform the following operations: receiving a first communication from a first public device, the first communication being based on the audio message and indicating the request to access the account on one of the public devices; determining, based on the first communication, that the portable computing device is authorized to access the account; and in response to determining that the portable computing device is authorized, sending a second communication to a second public device. The second public device is configured to initiate a communication session with the portable computing device upon receiving the second communication from the backend server.

Such system can optionally include one or more of the following features: identifying the second public device from the one or more public devices by determining that the second public device is geographically located within a predetermined range of the portable computing device; the second public device is the closest public device to the portable computing device from among the one or more public devices; the first public device is the same as the second public device; the first public device is configured to decode the audio message to obtain a numeric code encoded in the audio message, and provide the first communication at least partly based on the numeric code.

Implementations of the present disclosure provide one or more of the following advantages over previously available solutions. The implementations improve the performance of computing systems that facilitate multi-factor authentications, by reducing the error rate associated with entering a security code. In traditional systems, multi-factor authentication on a first device (e.g., a laptop) is performed by receiving a security code on a second device (e.g., a cell phone), and entering the security code and an account specific information (e.g., username, password) on the first device. Based on this traditional procedure, a user needs to monitor and read the security code on the second device, and enter the security code on the first device. This procedure often has a high rate of errors because it leads to misreading or typographical errors in entering the security code. Such errors lead to reduction in the operation speed and cause network traffic when authentication is needed. Further, it causes visually impaired users to need assistance for reading and/or entering the security code on the first and the second devices.

Using implementations of the present disclosure, a user does not need to monitor a security code on the second device and enter the code on the first device for multi-factor authentication on the first device. By encoding the security code in an audio message that is played by the first device and received by the second device, implementations of the present disclosure avoid the above-described problems exhibited by traditional systems. Accordingly, implementations avoid the expenditure of processing resources, memory, storage capacity, network bandwidth, and/or other computing resources that traditional systems must use to respond to errors and other problems in multi-factor authentications.

Additionally, the implementations eliminate the need for working directly on the first device to enter the security code, to access the user account, and/or to control the user account (that has been accessed). For example, in traditional systems when the first device is a shared device (e.g., a public device such as an automatic teller machine (ATM)), a user would need to use an input device (e.g., a keypad) of the first device that is shared by multiple users to enter a security code, and to access or control user accounts. By establishing a communication session between the first device and the second device (e.g., the user's smart phone), the user can use a private second device to access and control a user account on the shared first device. For an example, a user of the implementations can withdraw money from a user account on an ATM (as first device) by navigating through the user account (e.g., selecting a monetary amount) on the user's cell phone (as second device) instead of using the ATM keypad. Such feature helps each user to use one or more portable devices that are accustomed with the users' preferences (e.g., customized for a visually impaired user, or personalized for a user who is concerned about unhygienic public devices) to work with devices shared between other users.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 3A-3D depict example user interfaces on an example portable device, according to implementations of the present disclosure.

DETAILED DESCRIPTION

Figure 1:
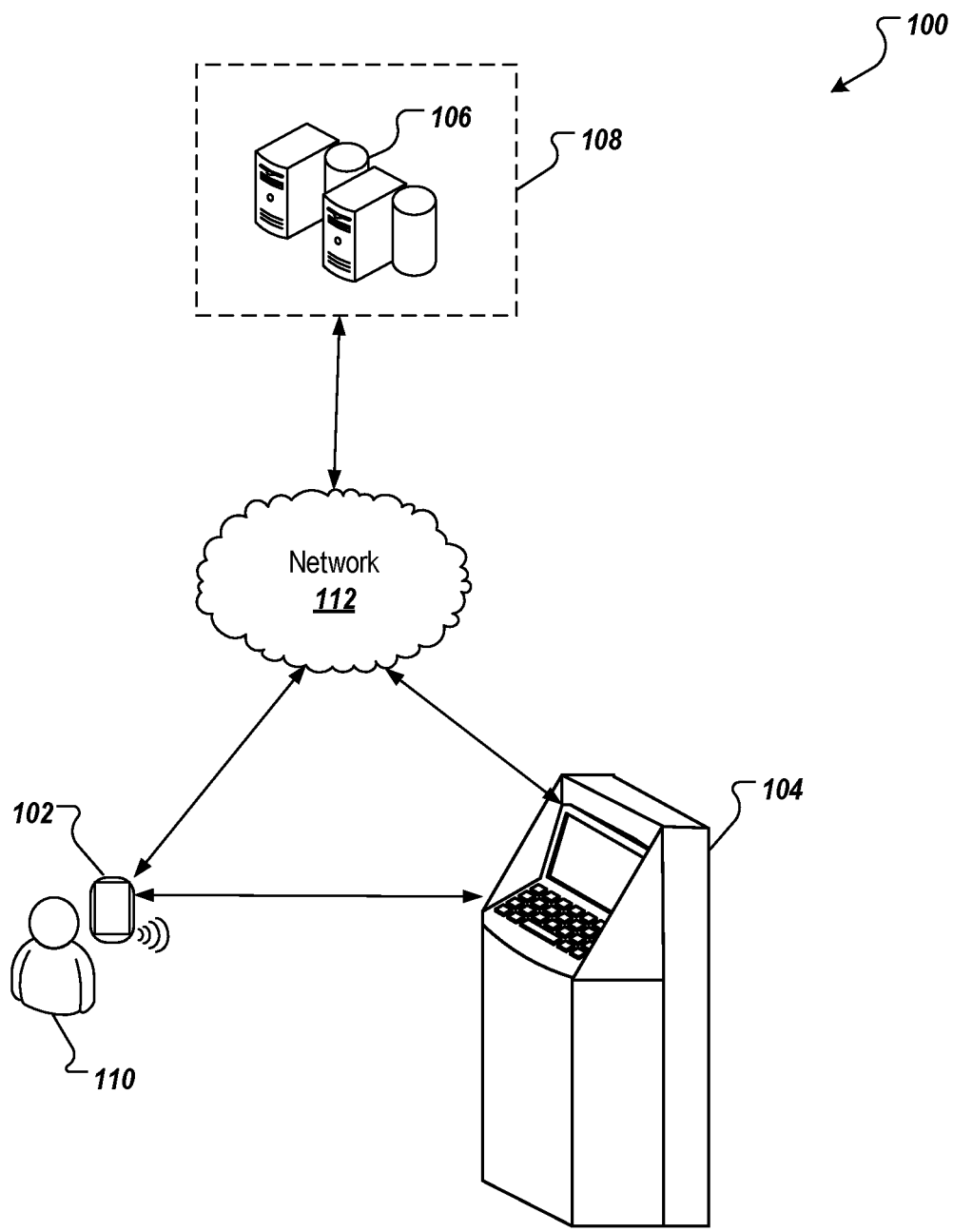
FIG. 1 depicts an example environment that can be used for implementations of the present disclosure.

Implementations of the present disclosure are directed to systems, devices, methods, and computer-readable media for audio-based multi-factor authentication. The multi-factor authentication is performed to provide a user of a first device (e.g., a smart phone) access an account on a second device (e.g., an ATM). The first device (also referred to as a "portable device" herein) can be a user specific device. For example, the first device can be an electronic fob device, a cell phone, etc. The second device (which can be referred to as a "public device" in some examples) can be a device specific to the user (e.g., a smart phone). In some instances, the second device is a device used by more than one user, such as an intelligent voice interactive device and/or personal assistant device (e.g., ALEXA, GOOGLE HOME, etc.), or a publicly available device that can be used by many individuals, such as an Automatic Teller Machine (ATM). For a multi-factor authentication, the user may need to enter one or more user account specific information, and one or more randomly generated security codes into the second device. For example, the user may need to enter a username associated with the user account (e.g., as an authentication factor), and a security code generated for the current attempt of accessing the user account (e.g., another authentication factor). According to the implementations of the present disclosure, the user can access and/or control the user account on the public device by working with the public device indirectly and through the portable device.

In at least some implementations of the present disclosure, the portable device transmits an audio message to request access to an user account on the public device. The audio message can be, or can contain, a (e.g., random) code that is played by the portable device.

In some examples, the portable device sends the request (e.g., plays the audio message) to the public device, and based on the request, the public device sends inquiries to a backend server to determine whether the portable device (or the user of the first device) is authorized to access the user account. The backend server sends a communication to the public device indicating whether or not the portable device (or a user of the portable device) is authorized to access the user account. In case that the communication indicates the portable device is authorized, the public device provides the user of the portable device access to the user account.

In some implementations, when the public device receives an indication that the portable device is authorized, an access session is established between the first and the second device. The access session may include sending one or more messages from the public device to the portable device, indicating that the authorization is approved. The access session may include a communication session (e.g., a pairing of the portable device and the public device) that enables the portable device (or the user of the portable device) to control the user account on the public device (through the portable device). For example, an application executing on the portable device may access the user account on the public device through the communication session. A user interface (UI) executing on the portable device may be used to send commands and/or requests regarding the user account, and so forth.

Implementations of the present disclosure are described in further detail herein with reference to an example context. The example context includes a cell phone (as the first device) that sends an audio message to a public device such as an ATM (as the second device) to access a user account, such as a bank account. It is contemplated, however, that implementations of the present disclosure can be realized in any appropriate context.

FIG. 1 depicts an example environment 100 that can be used to execute implementations of the present disclosure. The environment 100 includes one or more portable devices 102 that can communicate with at least one public device 104 (e.g., an ATM). Both the portable device 102 and the public device 104 can be in communication with one or more backend system 108, for example, over the network 112. The one or more backend system 108 can include one or more servers 106. The portable device 102 is controlled by the user 110.

To access an user account through the public device 104, the user 110 may send a request from the portable device 102 to the public device 104. The request can include one or more elements of previously established user account information (e.g., username, password). The request can include an audio message, or the request can be in form of an audio message.

In some implementations, the request includes a security code generated for the access request. For example, a numeric code may be encoded in the audio message. The code may have been generated for a multi-factor authentication of the portable device 102 (e.g., to be specific to the portable device 102). The code can be generated randomly, and/or based on particular encoding rules. The code may be generated for one-time use, or may be reusable by the portable device 102 (or reusable by different portable devices of the same user 110). In some examples, the code has an expiration. For example, the code may expire after ten second. In some examples, once the code is used (e.g., sent to the backend server 108) for a particular number of times (e.g., one time), the code expires. The code can be generated by the portable device 102, or by another device (e.g., a user device, or the backend server 108) and be sent to the portable device 102 for a multi-factor authentication.

The code can be based on a numeric system. For example, the code can be based on a hexadecimal system, a binary system, etc. The code can have a variable, or a pre-set fixed length (e.g., six character).

In some implementations, each character (e.g., number) in the code is associated with a particular audio note (or group of notes). In some implementations, each character in the code is associated with a particular audio tone. For example, the code can be encoded into the audio message by dual-tone multi-frequency (DTMF) encoding.

In some implementations, the code is sent to the public device for a number of times so that potential errors caused by transmitting the code can be corrected. In some implementations, each character of the code is redundantly sent to the public device for error correction. In some examples, the audio message (or each note) is repeatedly played for a predetermined number of times (e.g., five times). For example, there may be redundancy of tones in the audio message played by the portable device. In some examples, the audio message is repeatedly played for a predetermined period of time (e.g., ten seconds).

In response to receiving the request from the portable device, the public device 104 sends an inquiry message to the backend system 108 to inquire whether the portable device 102 is authorized to access the requested user account. The inquiry message is based on the request received from the portable device 102. For example, the inquiry message can be generated based on the audio message received from the portable device 102.

The inquiry message can be generated based on a security code encoded in the audio message. In some implementations, the audio message is decoded at the public device. The public device may include the decoded (or a variation of the decoded) audio message (or the security code) in the inquiry message. For example, the public device may decode the audio message to obtain a numeric code encoded in the audio message, and include the numeric code in the inquiry message. In some implementation, the audio message is decoded at the backend server 108. For example, the public device may send the audio message to the backend server 108 by encoding the audio message into the inquiry message (e.g., by transforming the audio message into a digital message).

The backend server 108 determines whether the portable device 102 is authorized to access the user account based on the received inquiry message, which is based on the audio message. For example, the backend server 108 may compare the code in the inquiry message to a code associated with the portable device (or associated to the user of the portable device) to determine the authorization. The backend server transmits a communication back to the public device 104, indicating whether the portable device 102 is authorized. Based on whether the user 104 is or is not authorized to access the user account, the public device 104 accepts or rejects the access request.

In addition to the code, the backend server 108 may receive one or more elements of account information associated with the requested user account, from the portable device or the public device. Examples of the one or more elements of account information include, but is not limited to, a username, a password, a phone number, answer to a security question, or biometric information (e.g., fingerprint, voiceprint, facial recognition, etc.). For example, the portable device may send one or more elements of the account information directly to the backend server, or to the public device (as part of the user account access request, or in a communication separate from the request), which forwards the preset information to the backend server. For example, a user may login to an application on the portable device 102 by entering one or more elements (e.g., in one or more data fields) as elements of account information.

The one or more elements of account information can be transmitted to the backend server 108 to be compared with the pre-established elements of the user account. In some implementations, the pre-established elements (e.g., username, password) and devices associated with the user accounts (e.g., authorization to access) are stored in one or more data storages. The backend server 108 may access the one or more data storages to determine the authorization of the portable device 102 (or the user of the portable device 102) based on the one or elements submitted by the portable device 102 through the access request.

In response to determining the authorization, the backend server 108 transmits a communication to the public device 104, indicating whether the portable device 102 is authorized. In some implementations, the backend server 108 sends the authorization message to one or more public devices (including the public device 104) to which the backend server 108 is in communication. In some implementations, the backend server 108 determines one or more particular public devices (e.g., the public device 104) as destinations of the authorization message. For example, the backend server may determine the public device 104 based on the information in the inquiry message received from the public device 104, or based on one or more communications received from the portable device 102, specifying which public devices the portable device 102 is targeting.

In some implementations, the backend server 108 determines the destination based on a geographical location of the portable device 102 and a geographical location of the public device 104, for example, based on one or more communications between the backend server, and the public or the portable devices. In some examples, the backend server determines one or more particular public devices that are within a predetermined range of the portable device 102 (e.g., within 300 feet) and sends the authorization message to those one or more particular public devices. In some cases, the backend server determines at least one public device that is in closest distance to the portable device, and sends the authorization message to that closest public device.

FIGS. 2A-2D illustrate example multi-factor authentication procedures, according to some implementations of the present disclosure. Each of the FIGS. 2A-2D includes a portable device 202 (e.g., portable device 102), a public device 204 (e.g., public device 104), and a backend server 206 (e.g., backend server 108). Each of the portable device 202 and the public device 204 can be specific to a user, or shared among multiple users (e.g., an electronic fob, a cell phone, a tablet, an intelligent interactive device).

Figure 2A:
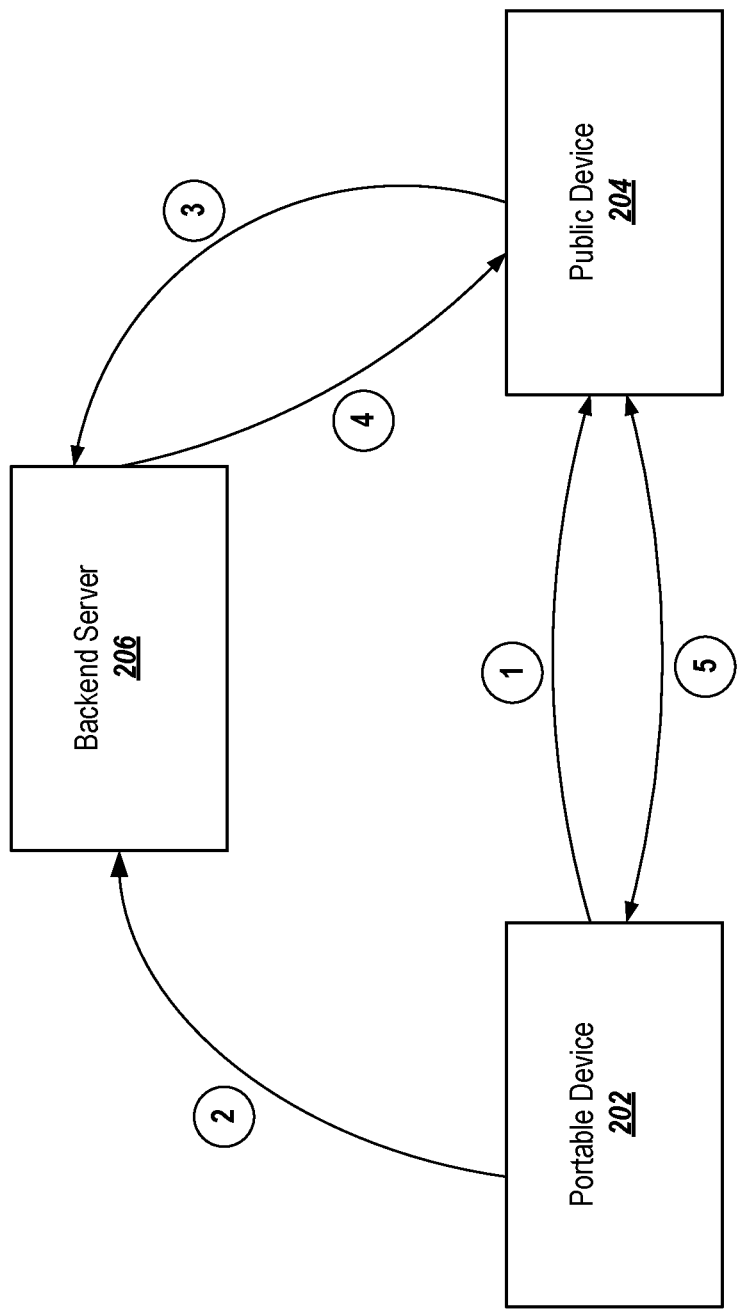
FIGS. 2A-2D illustrate example multi-factor authentication procedures, according to some implementations of the present disclosure.

In the example procedure of FIG. 2A, the portable device 202 sends a request (for example, through a first communication) to the public device 204, requesting to access a user account on the public device 204. As explained above, the request can include an audio message, or can be in form of an audio message. In some examples, the request includes a security code.

The portable device 202 sends a second communication to the backend server 206, indicating information of the request. For example, the portable device sends to the backend server information about the requested user account or about the public device 204 from which the access is requested. In some examples, the second communication includes the security code (which is encoded in the request). In some examples, the second communication includes one or more information associated with the preset information of the user account (e.g., username, password).

The backend server 206 sends an authorization message (e.g., the fourth communication in FIG. 2A) to the public device 204, indicating whether or not the portable device 202 is authorized to access the user account. In some examples, the backend server 206 sends the authorization message in response to receiving an inquiry message (e.g., the third communication in FIG. 2A) from the public device 204. The inquiry message may be sent from the public device 204 in response to receiving the access request from the portable device 202. The inquiry message inquires whether the portable device is authorized to access the requested user account.

To determine the destination of the fourth communication, in some cases, the backend server sends the authorization message to the public device 204 from which the backend server has received the inquiry message. In some cases, the backend server 206 determines the destination based on the information on the second communication. For example, and as described previously, the second communication may include information of the public device 204 to which the portable device 202 has sent the account access request. In some cases, the backend server 206 determines the destination based on the geographical location of the portable device 202. For example, the second communication can have information of the current location of the portable device; using this information, the backend server can determine one or more public devices that are within a predetermined range of the portable device 102 and send the authorization message to the one or more public devices.

In some implementations of the process depicted in FIG. 2A, the portable device 202 sends an access request through the first communication. The first communication includes a security code that is specific to the access request. The portable device sends a second communication to the backend system, indicating that the request has been sent to a public device. The second communication can include data about information of the public device 204, information of the portable device 202, and/or a first code that is generated based on the security code. The public device 204 sends an inquiry to the backend server 206. The inquiry includes a second code that is generated based on the security code. For example, the second code can be the same as the security code, or the security code can be derivable from the second code.

The backend server compares the first code with the second code to determine whether the first code associates with the second code (e.g., whether the two codes match, or differ on a predetermined acceptable number of characters). The backend server may also access one or more data storages to determine whether the portable device corresponds with the requested user account. In response to determining the association of the codes and association of the portable device to the user account, the backend server sends the fourth communication to the public device 204, confirming that the portable device 202 is authorized to access the requested user account.

In some implementations, the portable device generates the security code and/or the first code based on a seed stored on the portable device. In some examples, the portable device runs a routine to randomly (or pseudo-randomly) generate a code periodically (e.g., once a minute) based on the seed.

With reference to the example process in FIG. 2A, the portable device 202 may send information of the seed to the backend system 206 through the second communication. The backend system may store the seed and associate it with the portable device. When the backend server receives an inquiry (for authentication of the portable device) from the public device, the backend server may generate a code based on the seed, and compare the generated code with the data in the inquiry (e.g., the second code explained above). If the generated code and the received data match, the backend server confirms the authentication and communicates the confirmation to the public device 204 (e.g., through the fourth communication in FIG. 2A).

Depending on whether or not the portable device 202 is authorized to access the user account, the public device 204 may send a fifth communication to the portable device accepting or rejecting the access request. In response to determining that the portable device 202 is authorized, the public device 204 may receive one or more communications (e.g., through the fifth communication in FIG. 2A) from the portable device 202 regarding the user account, such as determining account balance, withdrawing money, transferring funds, etc.

Figure 2B:
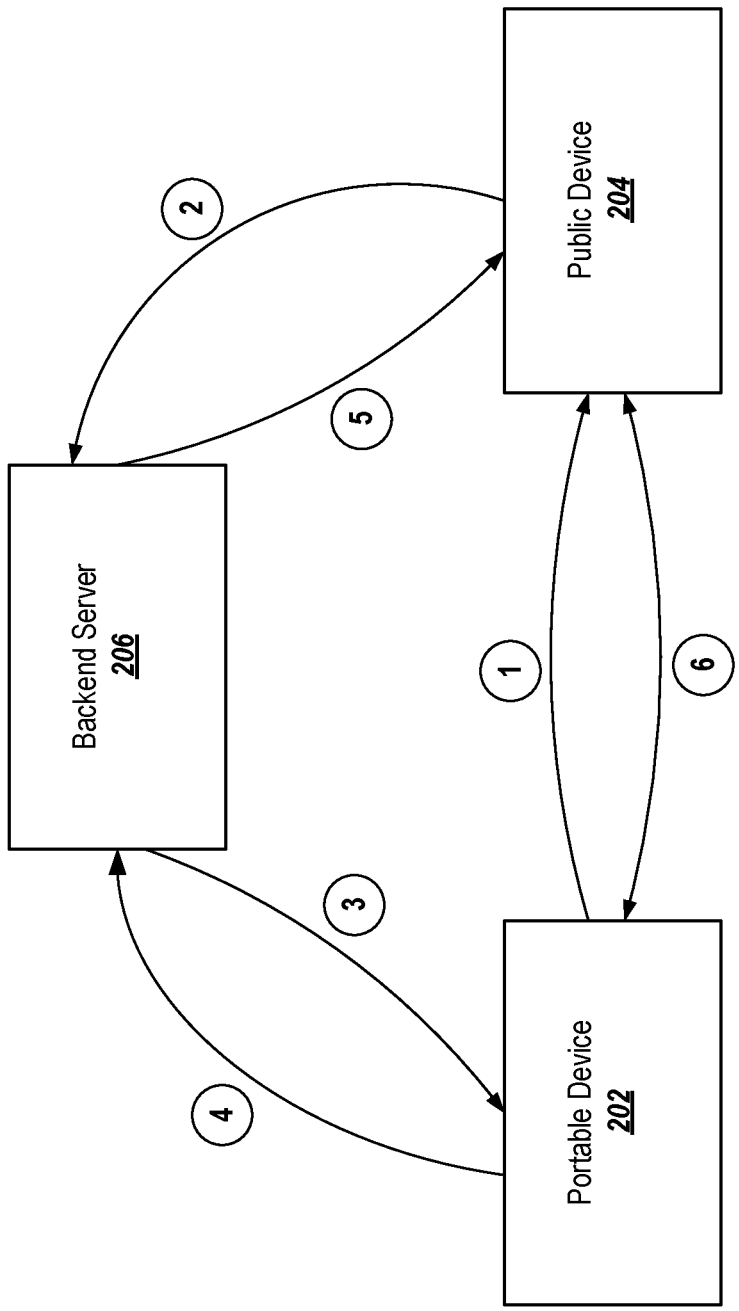

In the example procedure of FIG. 2B, similar to FIG. 2A, the portable device 202 sends a request to access a user account on the public device 204 through a first communication. The public device 204 sends an inquiry message (e.g., through the second communication in FIG. 2B) to the backend server, inquiring whether the portable device 202 is authorized to access the user account. Based on the inquiry message, the backend server 206 determines the portable device that has requested the access and sends a third communication to the portable device 202.

The third communication may request one or more information required for accessing the user account, such as a username and a password associated with the user account. The portable device 202 returns a fourth communication that includes information requested by the backend server in the third communication. The backend server determines whether or not the portable device 202 is authorized to access the requested user account based on the information in received in the fourth communication.

The backend server sends an authorization message (e.g., the fifth communication in FIG. 2B) to the public device 204, indicating whether or not the portable device is authorized. Depending on whether or not the portable device 202 is authorized, the public device 204 may send a sixth communication to the portable device 202 accepting or rejecting the access request. In response to determining that the portable device 202 is authorized, the public device 204 may receive one or more communications (e.g., through the sixth communication in FIG. 2B) from the portable device 202 regarding the user account.

In some implementations, the access request includes a code associated with the portable device 202. The public device 204 may include the code (or a variation of the code) in the inquiry message (e.g., the second communication) sent to the backend server 206. The backend server requests the code from the portable device 202 in the third communication. The portable device may send the code (or a variation of the code based on one or more predetermined encryption rules) to the backend server 206 through the fourth communication. To determine authentication (or authorization) of the portable device 202, the backend server 206 can verify that the code from the portable device matches (or associates with) the code from the public device.

Figure 2C:
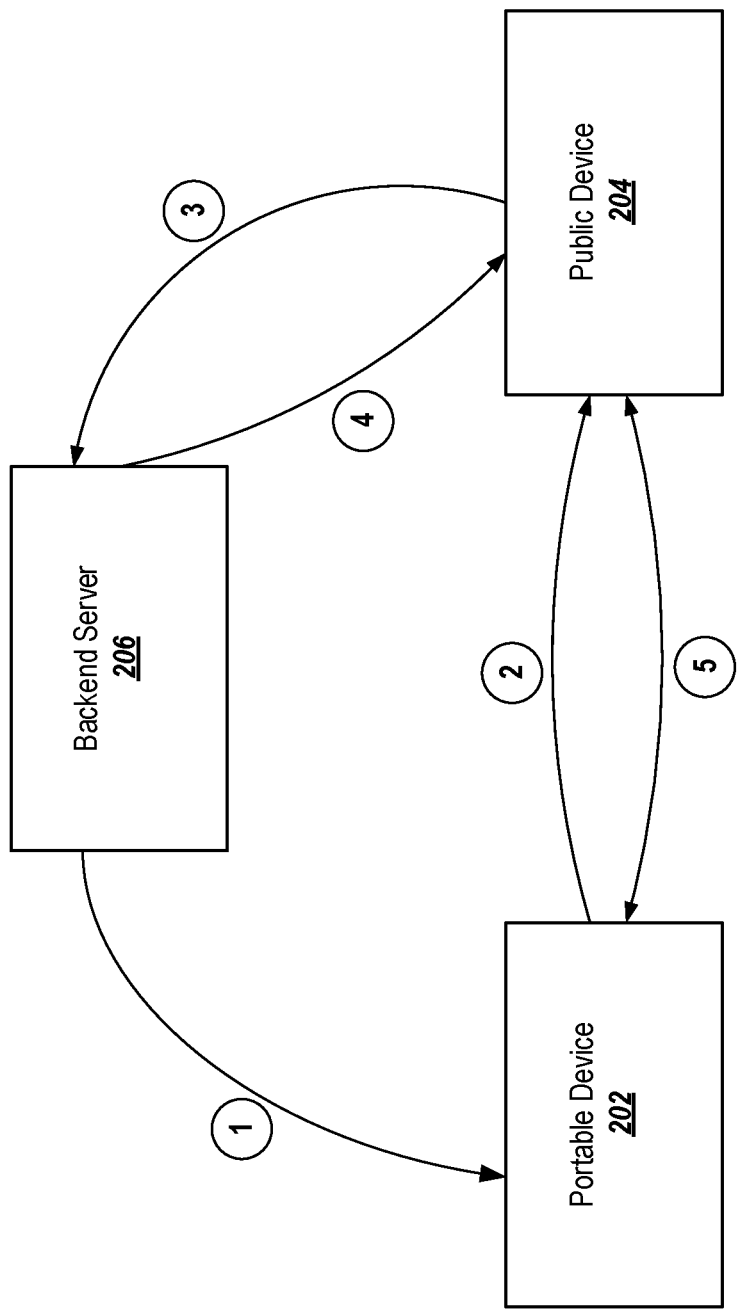

In the example procedure of FIG. 2C, the backend server 206 informs the portable device 202 that the portable device 202 is associated with a user account through a first communication. The backend server stores this association in one or more data storages. The portable device 202 sends a request to access the user account on the public device 204 through a second communication. The public device 204 sends an inquiry message (e.g., through a third communication) to the backend server 206, inquiring the authorization of the portable device 202. The backend server 206 may access the one or more data storages to determine whether the portable device 202 is associated with the requested user account. Based on the information in the data storages, the backend server 206 sends an authorization message (e.g., through a fourth communication) indicating whether or not the portable device 202 is authorized. Depending on whether or not the portable device 202 is authorized, the public device 204 may send a fifth communication to the portable device 202 accepting or rejecting the access request. In response to determining that the portable device 202 is authorized, the public device 204 may receive one or more communications (e.g., through the fifth communication 5) from the portable device 202 regarding the user account.

In some implementations, the first communication includes a code associated with the portable device (or associated with the user account or the user of the portable device). The backend server 206 may store the code in a data storage. The portable device 202 may include the code (or a variation of the code based on one or more predetermined encryption rules) in the access request (e.g., the second communication). The public device may include the code (or a variation of the code) in the inquiry message sent to the backend server. The backend server may check the code to determine the authentication or authorization of the portable device, for example, based on whether the code is associated with the portable device (or with the user account). For example, the backend server may verify the association of the portable device with the requested account, by accessing the data storage and comparing a code stored there for the user account, with the code received from the public device.

Figure 2D:
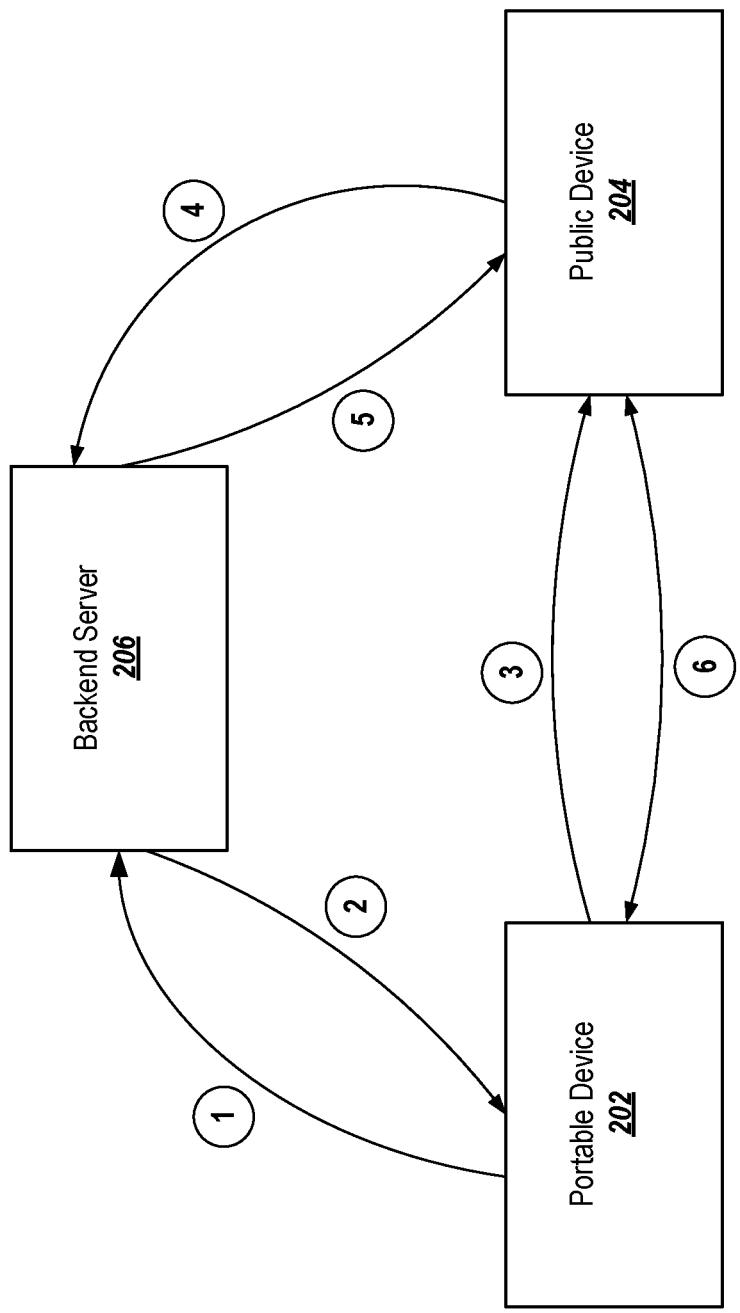

In the example procedure of FIG. 2D, the portable device 202 sends an informatory communication (e.g., the first communication in FIG. 2D) to the backend server 206. The informatory communication can include information indicating that the portable device is authorized to access one or more accounts (of a user). For example, the user may verify that the portable device is the user's personal device and is authorized to access the one or more accounts. The backend server associates the portable device to each of the one or more accounts and stores such association in one or more data storages. The backend server may send back a second communication to the portable device, confirming that the association has been completed (e.g., has been stored).

The portable device 202 sends a third communication to the public device 204 requesting access to a user account. In response to receiving the request, the public device 204 sends a fourth communication to the backend server inquiring the authorization of the portable device 202. The fourth communication may include information of the portable device 202 and/or the requested account.

Based on the information in the fourth communication, the backend server determines whether the portable device 202 is authorized to access the requested user account. For example, the backend server determines whether the requested user account is one of the one or more user accounts associated with the portable device 202. For example, the backend server accesses the data storage to determine the association.

The backend server sends back a fifth communication to the public device 204, indicating whether or not the portable device 202 is authorized. Depending on whether or not the portable device 202 is authorized, the public device 204 may send a sixth communication to the portable device 202, accepting or rejecting the access request. In response to receiving a determination that the portable device 202 is authorized, the public device 204 may receive one or more communications (e.g., communication 6 in FIG. 2D) from the portable device 202 regarding the user account.

In some implementations according to the example process of FIG. 2D, at least one of the first and the second communications includes at least one code specific to the portable device 202 (or specific to at least one of the one or more accounts, or to the user of the portable device). In some examples, each of the one or more user accounts (to which the portable device is associated) is associated with a particular code. In some examples, at least two of the one or more user accounts share the same code.

When the portable device requests access to a user account, the portable device sends a code (or a variation of the code) associated with the portable device (or associated with the requested user account) to the public device as part of the access request (e.g., through the third communication). The public device 204 may send the code (or a variation of the code) to the backend server 206. The backend server 206 can use the code to verify whether the portable device 202 is associated with the requested user account. For example, the backend server may compare the code received from the public device with the code from either of the first and the second communications to determine the association of the portable device with the requested user account.

In some implementations, the public device 204 is an intelligent interactive device (e.g., AMAZON ALEXA). When a user (e.g., user 110) requests access to a user account, the public device may request an authorization code from the portable device. For example, the user 110 may verbally request the access, and the public device 204 may reply back requesting the authorization code. In some examples, the user states a code. In some examples, the authorization code is encoded in an audio message and the portable device 202 plays the audio message.

In some implementations, in response to determining that the portable device 102 is authorized, a communication session (e.g., pairing) is established between the portable device 102 and the public device 104. The communication session can enable a user of the portable device 102 (e.g., user 110) to access one or more user accounts on the public device through the portable device. For example, once the communication session is established the user may be able to access or manage the requested user account on the public device 104 through an application executing on the portable device 102.

As an example, a user may be able to access a bank account on an ATM (e.g., public device 104) through a smart phone (e.g., portable device 102). The user may be able to do one or more transactions (e.g., withdraw or transfer money) on the ATM by navigating through the user smart phone (e.g., by entering one or more account numbers, dollar amount).

The user may also be able to do one or more changes to the account through the portable device. For example, the user may change one or more settings (e.g., username, password) or preferences (e.g., selecting one or more portable devices, public devices, or geographical locations) on the user account. Accordingly, the public device may receive one or more communications from the portable device to make the one or more changes to the user account.

FIGS. 3A-3D depict example user interfaces on an example portable device, according to implementations of the present disclosure. The portable device can be the portable devices 102 or 202 and can be used for requesting access to a user account, sending or receiving one or more authorization codes, or navigating through the accessed user account on a second device (e.g., the public device 104, 204).

Figure 3B:
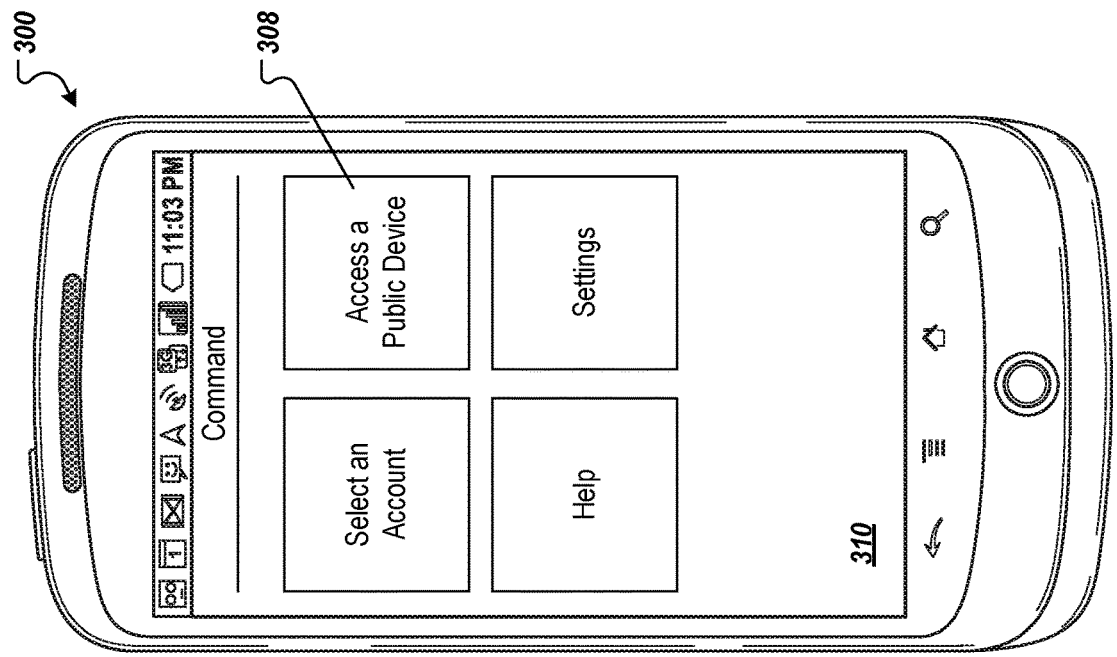
Figure 3A:
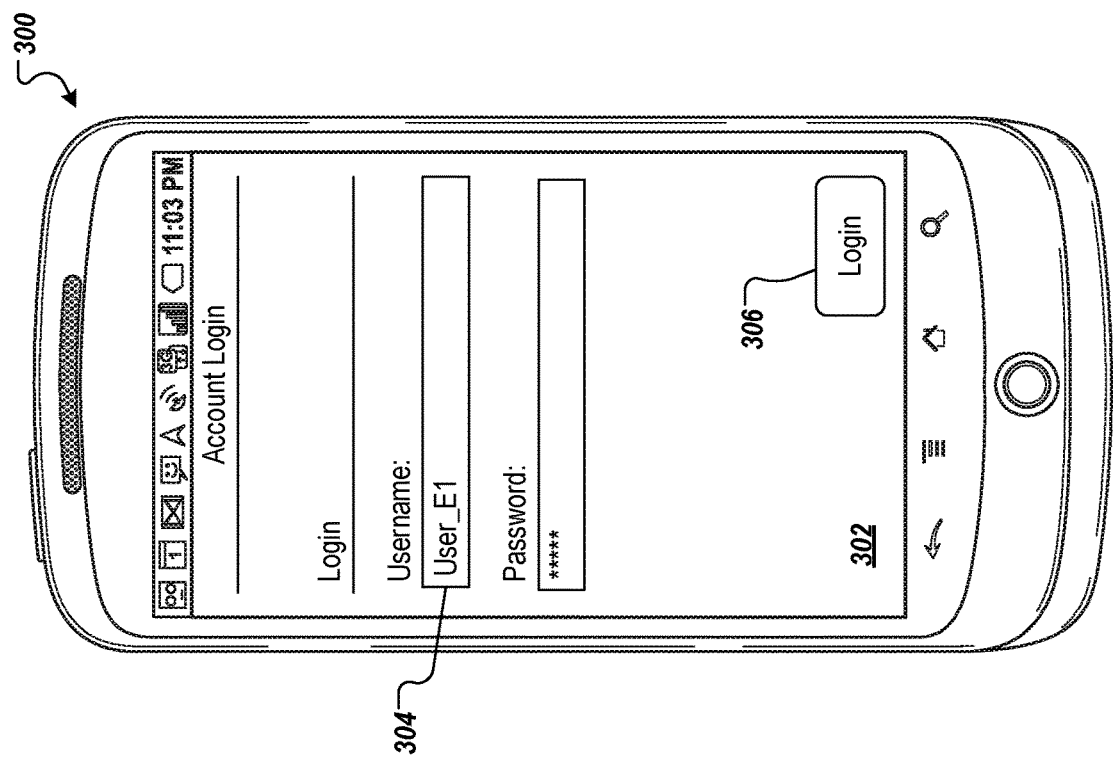

FIG. 3A depicts an example login page 302 on the example portable device 300. The login page 302 includes one or more field data 304, and one or more selectable login icons 306. A user (e.g., user 110) may enter account access data (e.g., username, password) associated with a user account in the field data 304. The user account may be an account that the user would like to access on a public device (e.g., the public device 204, or a second portable device).

In some implementations, the account access data is sent to one or more backend servers (e.g., the backend server 206), for example, upon selecting the login icon 306. In some implementations, the account access data is sent to the public device along with a request to access the user account on the public device. The public device may forward the account access data to the backend server. In some implementations, the user can request accessing the user account on the public device after the user has logged into the user account.

FIG. 3B illustrates an example command user interface (UI) 310 on the example portable device 300. The command UI 310 includes one or more selectable command icons. For example, by clicking on the command icon 308, the portable device 300 may select a public device on which a user account is to be accessed. The command UI 310 may be presented to the user upon logging into an user account (e.g., upon selecting the login icon 306 on FIG. 3A), or upon opening an application (e.g., an application for accessing a user account on a public device) on the portable device 300. The example command icons presented in command UI 310 are provided for description purposes. A skilled person in the art would recognize that the command UI 310 can have other command icons for identifying what user account to be accessed on what public device (e.g., icons such as Select a Location, and Login to an Account, which can lead to a login page such as the login page 302).

FIG. 3C illustrates an example UI 312 for selecting a public device, on the example portable device 300. The UI 312 can include one or more icons (e.g., icons 314, 316, 318) for selecting the public device at which a user account is to be accessed. For example, the icon 314 provides one or more public devices that have been saved as preferred public device on the portable device 300, or for a particular user account to which the user has logged in (e.g., through the login page 302).

By selecting the icon 316 the device 300 may detect one or more public devices, for example, in a proximity of the portable device 300. For example, the portable device may detect the public devices based on the geographical location of the public devices. In some examples, the portable device 300 provides a list of the detected public devices to the user for selection. In some examples, the portable device 300 detects the public devices within a particular range of the portable device (e.g., 500 feet). In some example, the portable device selects the public devices that are closest to the portable device 300. By selecting the icon 318, a list of the recently selected (or detected) public devices can be provided.

The user may also be prompted to specify what services are to be performed on the public device. A user may be prompted to specify the services before, or after sending an access request to the public device. The services can be included in the access request, or can be sent separately from the access request (e.g., before, or after the portable device's authorization is verified). As described previously, in some implementations, a communication session is established between the portable and the public device upon determining that the portable device is authorized to access the requested user account. In some examples, the portable device can use the communication session to request specific services to the public device.

FIG. 3D illustrates an example service UI 322 for determining one or more services to be performed on the public device 300. The service UI 322 includes one or more data fields (e.g., data fields 324, 326), through which the UI 322 can let the user specify an action to be performed (e.g., perform a transaction) and an account for performing the action (e.g., a saving account). The selected services can be sent out to the public device, for example, by selecting the request icon 328.

Figure 4:
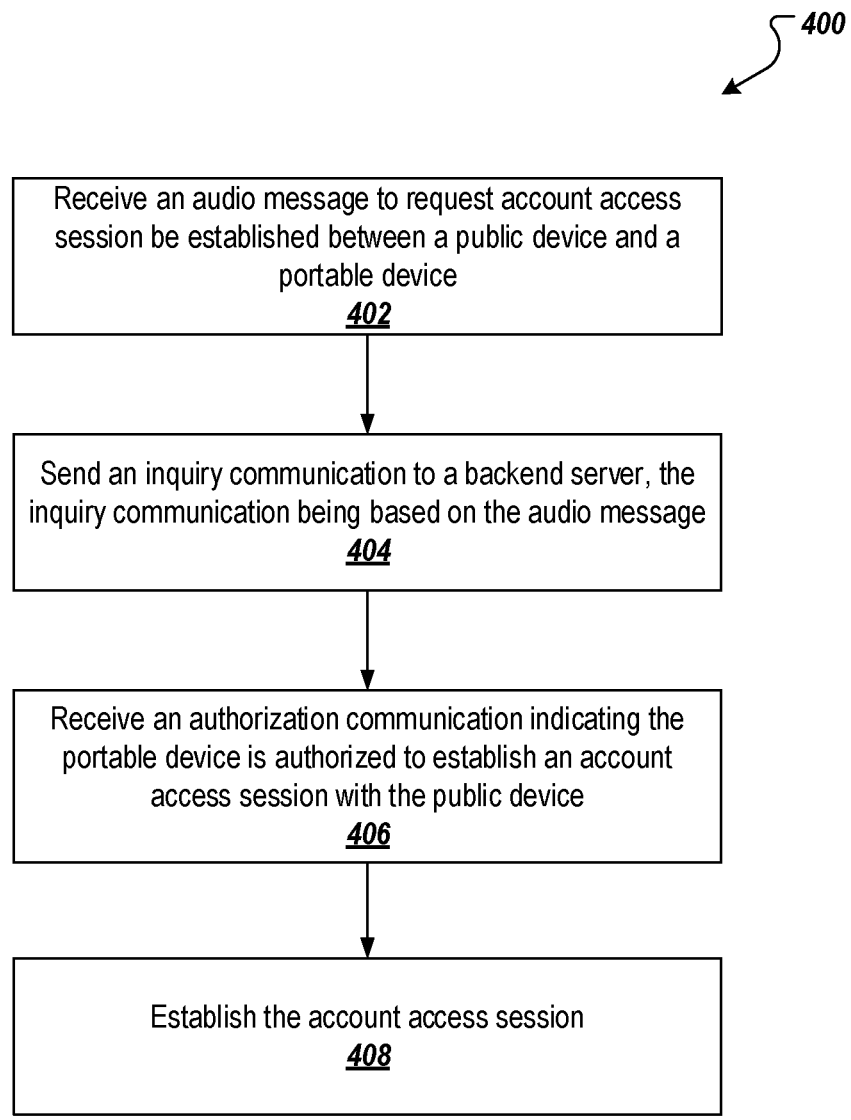
FIG. 4 depicts a flow diagram of an example process for multi-factor authentication, according to implementations of the present disclosure.

FIG. 4 depicts a flow diagram of an example process 400 for multi-factor authentication, according to implementations of the present disclosure. Operations of the process 400 may be performed by a public device (e.g., the public device 104, 204) to provide access to a user account to a portable device (e.g., the portable device 102, 202).

At 402, an audio message is received; the audio message is to request an account access session (or a communication session) between the public device and a portable device. As described previously, the audio message may be a part of a request message sent by the portable device, requesting to access a user account. For example, the audio message can be sent as part of the first communications in FIGS. 2A-2C or as part of the second communication in FIG. 2D. The user account is to be accessed (and possibly controlled) by the portable device through the account access session.

At 404, an inquiry communication, which is based on the audio message, is sent to a backend server. For example, the inquiry communication may include a code that was encoded in the audio message. Examples of the inquiry communication include, but are not limited to, the third, the second, the third, and the fourth communications in FIGS. 2A, 2B, 2C, and 2D, respectively. In some implementations, the backend server uses the inquiry communication to determines whether the portable device is authorized to establish the account access session with the public device. For example, backend server may get information of the portable device, or the requested user account (or both) based on the inquiry communication. To verify authorization of the portable devices, the backend server may access one or more data storages that include association of portable devices with user accounts.

At 406, an authorization communication is received, indicating the portable device is authorized to establish an account access session with the public device. For example, upon determining that the portable device is authorized to access the requested user account, the backend server may send the authorization communication to the public device. Examples of the authorization communication include, but are not limited to the fourth, the fifth, the fourth, and the fifth communications in FIGS. 2A, 2B, 2C, and 2D, respectively.

At 408, the account access session is established. For example, the public device may be paired with the portable device in response to receiving the authorization communication. The account access session can be employed by an application executing on the portable device to access account information associated with at least one user accounts of a user of the portable device. In some implementations, the account access session is established if the authorization communication indicates that the portable device is authorized to access the requested user account. In some implementations, if the authorization communication indicates that the portable device is not authorized, the public device rejects the portable device's request to establish the account access session. In some cases, the public device sends a message to the portable device informing the portable device whether or not the account access session is accepted or rejected.

Figure 5:
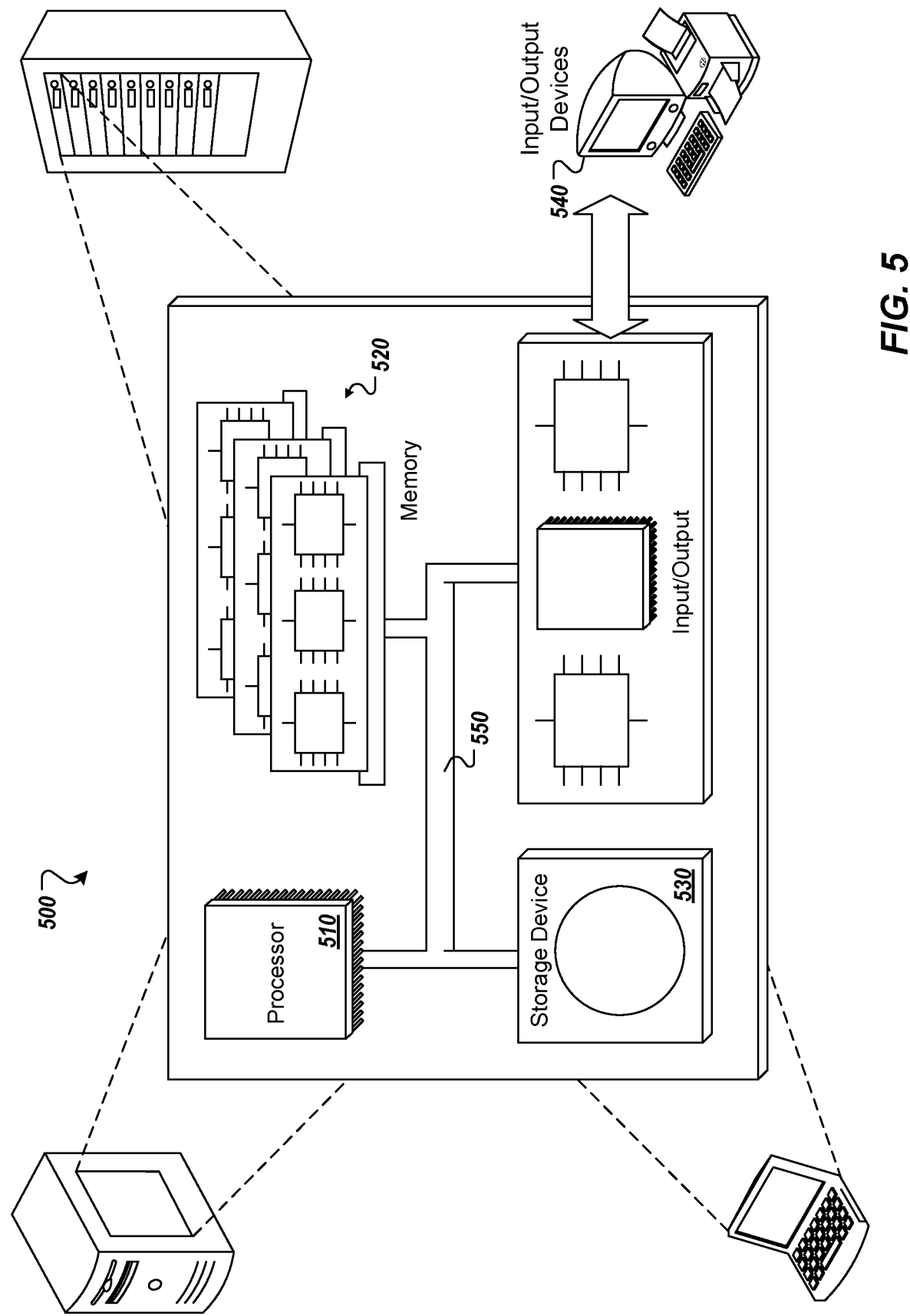
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in the portable device 120, the public device 104, the backend server 108, and/or other device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input. In some instances, input and/or output may be received and/or provided through an augmented reality and/or virtual reality system.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:
receiving, by a first device, an audible message from a portable computing device, wherein the audible message comprises a numeric code randomly generated based at least in part on a seed value stored on the portable first device;
extracting, by the first device, the numeric code from the audible message;
generating first communication data based on the audible message, wherein the first communication data comprises the numeric code or a variation of the numeric code and biometric information associated with a user of the first device;
sending, by the first device, the first communication data to at least one backend server;
analyzing, by the backend server, the first communication data to determine whether the portable computing device is an authorized device, wherein analyzing the first communication data comprises (1) verifying the biometric information, and (2) generating a local code from a local seed on the backend server and comparing the numeric code received in the first communication data and the local code;
identifying, by the backend server and using a location of the portable computing device, one or more additional devices that are located within a geographical distance from the portable computing device;
sending, by the backend server, second communication data to the first device and to the one or more additional devices, the second communication data indicating that the portable computing device is authorized to have an account access session with the first device and the one or more additional devices;
establishing, the account access session between the portable computing device and at least one of the first device or the additional devices; and
sending a confirmation message to the portable device confirming that the portable computing device is authorized to participate in the account access session.

2. The method of claim 1, further comprising:
subsequent to establishing the account access session, receiving a request from the portable computing device to perform a change on the account; and
updating information of the account based on the change identified in the request.

3. The method of claim 2, wherein the change includes one or more of transferring funds to the account and withdrawing funds from the account.

4. The method of claim 1, wherein the first device is an automated teller machine.

5. The method of claim 1, wherein the numeric code is provided for one-time use in determining whether the portable computing device is authorized.

6. The method of claim 1, wherein the second communication data indicates that the portable computing device is authorized to access the account.

7. The method of claim 1, wherein the numeric code is generated by the backend server specifically for the portable computing device.

8. A system comprising:
one or more public devices; and
a backend server,
wherein a first public device in the one or more public devices is configured to:
  receive an audible message from a portable computing device, wherein the audible message comprises a numeric code randomly generated based at least in part on a seed value stored on the portable device,
  extract the numeric code from the audible message,
  generate first communication data based on the audible message, wherein the first communication data comprises the numeric code or a variation of the numeric code and biometric information associated with a user of the first device, and
  send the first communication data to a backend server,
wherein the backend server is configured to:
  analyze the first communication data to determine whether the portable computing device is an authorized device, wherein analyzing the first communication data comprises (1) verifying the biometric information, and (2) generating a local code from a local seed on the backend server and comparing the numeric code received in the first communication data and the local code;
  identify, using a location of the portable computing device, one or more additional devices that are located within a geographical distance from the portable computing device, the one or more additional devices including a second public device,
  send second communication data to the one or more additional devices, the second communication data indicating that the portable computing device is authorized to have an account access session with the first device and the one or more additional devices; and
wherein a second public device in the one or more public devices is configured to:
  receive, from the backend server, second communication data indicating that the portable computing device is authorized to access a particular user account, wherein the second communication data is received subsequent to the backend server analyzing the first communication data to determine whether the portable computing device is an authorized device,
  initiate a communication session with the portable computing device subsequent to receiving the second communication from the backend server, and
  send a confirmation message to the portable computing device confirming that the portable device is authorized to access the particular user account.

9. The system of claim 8, wherein the second public device is geographically closest public device to the portable computing device from among the one or more public devices.

10. The system of claim 8, wherein the first public device is the same as the second public device.

11. A non-transitory computer-readable storage medium coupled to one or more processors of a first device and having instructions stored thereon which, when executed by the one or more processors, cause the one or more processors to perform operations, the operations comprising:
receiving an audible message from a portable computing device, wherein the audible message comprises a numeric code randomly generated based at least in part on a seed value stored on the portable device;
extracting the numeric code from the audible message;
generating first communication data based on the audible message, wherein the first communication data comprises the numeric code or a variation of the numeric code and biometric information associated with a user of the first device;
sending the first communication data to at least one backend server;
analyzing, by the backend server, the first communication data to determine whether the portable computing device is an authorized device, wherein analyzing the first communication data comprises (1) verifying the biometric information, and (2) generating a local code from a local seed on the backend server and comparing the numeric code received in the first communication data and the local code;
identifying, by the backend server and using a location of the portable computing device, one or more additional devices that are located within a geographical distance from the portable computing device;
sending, by the backend server, second communication data to the first device and to the one or more additional devices, the second communication data indicating that the portable computing device is authorized to have an account access session with the first device and the one or more additional devices;
establishing the account access session between the portable computing device and at least one of the first device or the additional devices; and
sending a confirmation message to the portable device confirming that the portable computing device is authorized to participate in the account access session.

12. The non-transitory computer-readable storage medium of claim 11, wherein the operations further comprise:
subsequent to establishing the account access session, receiving a request from the portable computing device to perform a change on a particular user account; and
updating information on the particular user account based on the change identified in the request.

13. The non-transitory computer-readable storage medium of claim 12, wherein the change includes one or more of transferring funds to the particular user account and withdrawing funds from the particular user account.

14. The non-transitory computer-readable storage medium of claim 11, wherein the first device is an automated teller machine.

15. The non-transitory computer-readable storage medium of claim 11, wherein the numeric code is provided for one-time use in determining whether the portable computing device is authorized.

16. The method of claim 1, wherein the numeric code is extracted from the audible message based on a redundancy of tones in the audible message.

17. The system of claim 8, wherein the first public device is configured to extract the numeric code from the audible message based on a redundancy of tones in the audible message.

18. The non-transitory computer-readable storage medium of claim 11, wherein the numeric code is extracted from the audible message based on a redundancy of tones in the audible message.

\* \* \* \* \*